Figure 2:
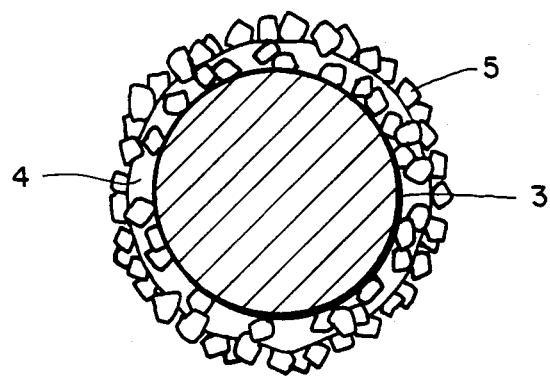

United States Patent [19]

Sump

[11] Patent Number: 4,489,877
[45] Date of Patent: Dec. 25, 1984

[54] PROCESS FOR BONDING REFRACTORY TO SURFACES

[75] Inventor: Cord H. Sump, Chattanooga, Tenn.

[73] Assignee: Combustion Engineering, Inc., Windsor, Conn.

[21] Appl. No.: 446,734

[22] Filed: Dec. 3, 1982

[51] Int. Cl.³ .............................................. B23K 1/04
[52] U.S. Cl. .................................. 228/178; 228/220; 228/248; 29/419 R
[58] Field of Search ............... 228/178, 182, 220, 219, 228/248; 29/419; 419/9

[56] References Cited

U.S. PATENT DOCUMENTS

| | | | |
|---|---|---|---|
| 2,332,726 | 10/1943 | Joyce | 228/178 X |
| 2,848,802 | 8/1958 | Luks | 228/220 X |
| 3,029,559 | 4/1962 | Trepton | 228/220 X |
| 3,310,387 | 3/1967 | Sump et al. | 29/419 X |
| 3,555,666 | 1/1971 | Rhee | 228/220 X |
| 3,716,347 | 2/1973 | Bergstrom et al. | 228/248 X |

Primary Examiner—Kenneth J. Ramsey
Attorney, Agent, or Firm—Arthur L. Wade

[57] ABSTRACT

A process is disclosed with which a viscous liquid vehicle is applied as a coating to strands, or fibers, of stainless steel to hold finely-divided brazing material at the surfaces of the strands. A mat of the coated strands/fibers is spread in a layer over the surface of a substrate and brought to the brazing temperature to form the desired bond. At the brazing temperature forming the bond, the viscous vehicle is evaporated, leaving no residue which deteriorates the quality of the brazing bond of the strands/fibers to each other, and the brazing bonds between the strands/fibers and the substrate.

6 Claims, 2 Drawing Figures

PROCESS FOR BONDING REFRACTORY TO SURFACES

TECHNICAL FIELD

The present invention relates to the support of refractory to shield surfaces from high temperatures, corrosive slag which forms complex sulfates, and corroding acids formed below the dew point of gases. More particularly, the invention relates to the process of forming a supporting framework of strands, or fibers, of structural metallic material on the surface of a substrate which will effectively hold refractory introduced into interstices of the framework for the formation of a support of the refractory by the substrate surface.

BACKGROUND ART

In heat exchange equipment exposed to direct and indirect sources of heat, the temperatures require the protection of the surfaces of equipment by a layer of refractory. As insulation and physical protection from deteriorating chemicals, refractory, more often than not, has dimensional changes which differ significantly from the dimensional changes of the material which it protects. This single condition may be only one of the factors which threaten support of the refractory by the protected surfaces.

Many different forms of projections have been welded to substrate surfaces to which it is necessary that refractory be applied as a protective layer. Protruding studs have been welded to these surfaces. Also, clips, anchors, and metal straps have been attached in various ways and in various configurations to substrate surfaces in attempts to lock on to the refractory material during the variable conditions to which the combination is exposed. Unfortunately, the refractory eventually falls out of its position among these projections, necessitating expensive maintenance and replacement.

The art has advanced to providing a matrix of metallic fibers, or strands mixed with the refractory. It has been recognized that a bond between the contacts of the fibers/strands with each other, and the fibers/strands with the substrate surface will substantially lengthen the support of the refractory by the substrate surface. However, a satisfactory process for high-temperature brazing the metal fibers/strands to each other, and the fibers/strands to the substrate, has eluded those skilled in this art. The difficulty is fundamentally in holding whatever bonding material is required close enough to the junction of metal fibers/strands and fibers/strands and substrate surface while the surfaces to be bonded are maintained clean enough to enable a dependable bond to be formed. Heretofore, all vehicles utilized to hold the bonding material to the strand-to-strand junctions, and strand-to-substrate junctions have been evaporated to leave residues which have created a low-quality bond at the junctions, or they have not held the brazing powder in place. From the foregoing description of the present art, a mechanism is required which will hold bonding material on the surfaces of metal strands/fibers until a bond of the strands/fibers to each other, and the strands/fibers to the substrate is completed without loss of bonding quality.

DISCLOSURE OF THE INVENTION

The present invention contemplates the process of coating structural metallic strands, or fibers, with a sufficiently viscous liquid-like vehicle which will hold high-temperature brazing powder material at the surfaces of the strands/fibers until a non-autogenous bond is formed under bonding conditions during which the vehicle is evaporated without leaving residue which will deteriorate the resulting bond between the metal strands/fibers and between strands/fibers and any substrate.

The invention further contemplates that the viscous liquid-like vehicle will be mixed with finely-divided high-temperature brazing material prior to coating the structural metallic strands/fibers with this mixture, and subsequently expose the coated strands/fibers to the bonding conditions.

The invention further contemplates coating stainless steel strands, or fibers, with an organic liquid-like material viscous enough to hold finely-divided or granulated brazing material at the surfaces of the strands/fibers while the strands/fibers are subjected to brazing temperature to form a brazing bond at the contact points of the strands/fibers, and the strands/fibers and a substrate, the evaporation of the vehicle not leaving a residue which would deteriorate the quality of the bonds.

The invention further contemplates coating strands/fibers of 310 stainless steel with polybutene having sufficient viscosity to hold finely-divided brazing alloys, such as the low-melting metal-phosphorus compounds, at the surfaces of the strands/fibers while the strands/fibers are exposed to a temperature in the order of 1900°–2100° F. to form a non-autogenous brazing bond between the contact points of the strands/fibers, and the strands/fibers and a substrate of stainless or carbon steel.

Other objects, advantages, and features of the invention will become apparent to one skilled in the art upon consideration of the written specification, appended claims and accompanying drawings.

BRIEF DESIGNATION OF THE DRAWINGS

Figure 1:
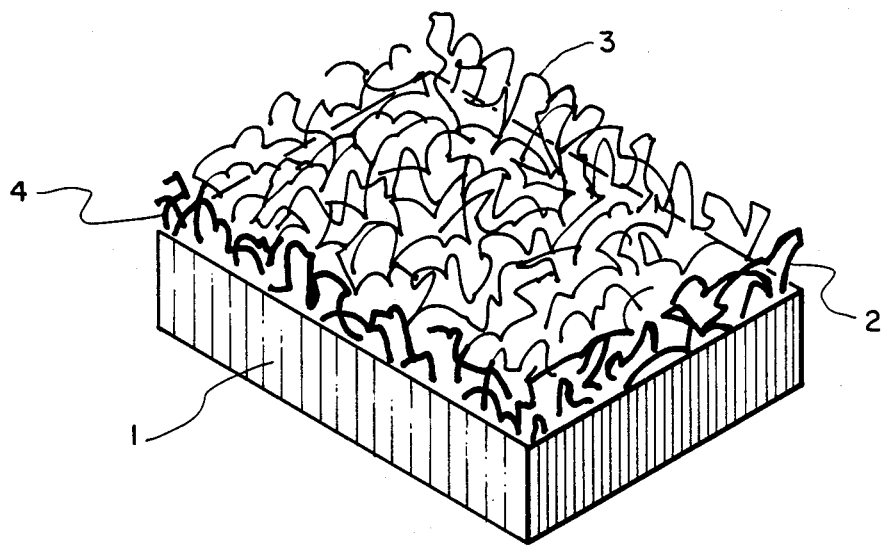

FIG. 1 is a perspective elevation of substrate material on which a framework of structural metallic strands is mounted by a process in which the present invention is embodied; and FIG. 2 is a greatly enlarged cross-section of a metallic fiber of FIG. 1 with granulated bonding material adhered to its surface with a liquid-like material.

TERMS AND TECHNOLOGY

The broad object of the invention is to bond structural metallic fibers to each other and these bonded fibers to a base or substrate. At this point, it is to be understood that the terms fibers, strands, and staples are equivalent in that they all refer to structural metallic material in wire-like form. In further specification, the metal fibers bonded by the best mode for practicing the invention will have an aspect ratio of at least 50 to 1, aspect ratio meaning the ratio of the length of the fiber to its diameter. For example, although the disclosure began with reference to fibers or strands as the form for the material, apparently some skilled in the art also use the term staples. Where this practice is followed, this disclosure wishes to recognize the common denominator of these terms and subsequently limit reference to fibers.

Structural fibers imply that the material for the fibers has the strength, when bonded to other fibers and to a substrate, to support refractory flowed into the interstices formed by the fibers randomly arranged in a mat.

Even more specifically, the best mode for practicing the invention has utilized 310 stainless steel as fiber material.

Provided with my 50 to 1 aspect ratio metallic fibers, a quantity of them are randomly collected in the form of a mat which is extended as a layer over a substrate whose surface is to be ultimately protected by refractory material held by the fibers. The problem addressed by the invention is to bond the metal fibers to each other where they touch, and to the substrate where it is contacted by the fibers. More specifically, the bonding contemplated in the practice of the present invention is not sintering, but is more accurately classified as brazing. Brazing requires additional material which fuses with the metallic fibers where they touch each other and where they contact the substrate. In summation, the present invention is practiced when the bonding required between metal fibers and the fibers and substrate requires brazing material to be held at the surface of the fibers while the non-autogenous bond is completed.

Finally, the control of the environment, including its temperature range required for brazing, in practicing the best mode with which the invention is carried out, is not to be regarded as limitations. The common denominator is to be found in the fact that whatever bonding or brazing material is required it must be held at the surface of the metal fibers by a medium which disappears during the bonding process without leaving a residue which has a deleterious effect on the quality of the bond, or falls off the fibers so that brazing is not effected. This brings the disclosure down to the essential element of the invention, a viscous, liquid-like material which will coat the surface of the metal fibers and hold high-temperature brazing material at the fiber surface so the non-autogenous bond may be completed under conditions which will evaporate the coating medium and leave no quality-deteriorating foreign material as a residue which would adversely affect the bond.

The term "substrate" should be understood as any of the surfaces requiring protection by a layer of refractory. Thus, the substrate may be the surface of a heat exchange tube, or wall. In the heat exchange art, these surfaces are subjected to physical and chemical assault upon their integrity. A layer of refractory between this substrate surface and the source of combustion can materially lengthen the life of the substrate. The present problem, of course, is to maintain the layer of refractory as a shield for a satisfactory length of time. It is the present invention which produces this supporting framework for the refractory over the surface of the substrate.

BEST MODE FOR CARRYING OUT THE INVENTION

The preferred material for the fibers is stainless steel. Specifically, 310 stainless steel has wide acceptance in the heating surface art. The surfaces which are subjected to deteriorating conditions and substances can be brazed satisfactorily to 310 stainless steel. In the heating art, the heating surfaces are usually, but not necessarily, limited to austenitic stainless steel and carbon steel.

The brazing alloys generally satisfactory with 310 stainless steel and the metallic substrates are the low-melting metal-phosphorus and metal-boron-silicon compounds. It is generally preferred for these materials to be formed into finely-divided granules, with sizes which may be classified as powder. It is these materials which must be held at the surfaces of the 310 stainless steel fibers while heating to a temperature of 1900°–2100° F. in a hydrogen atmosphere.

The prior art has considered several materials with which to hold brazing materials on the surface of the metal fibers. Some of the materials contained hydrocarbons and left a residue of ash and carbon. This residue seriously deteriorated the quality of the brazing bond. Furthermore, the prior art does not teach that brazing powder is effectively held on the fiber surfaces. Now, the present invention introduces polybutene as the essential element in carrying out the process, representing a material which will evaporate under the brazing conditions without leaving a residue which will lower the quality of the bond. Referring to FIG. 1, there is illustrated a substrate 1 on whose surface 2 are bonded fibers 3 which have been non-autogenous bonded to each other where they touch and to the surface 2 of the substrate 3 where they touch. So bonded, the metal fibers form interstices ready to receive refractory in sufficiently liquid-like form to flow into the interstices and over the surface 2 of the substrate.

FIG. 2 is an illustration of any of the metal fibers 3 in cross-section prepared by the process for the bonding. FIG. 2 illustrates a metal fiber 3 coated with the liquid-like material 4 which has sufficient viscosity to retain the granules of finely-divided bonding material 5 at the fiber surface. When the three elements of fiber, liquid-like material, and bonding material have been exposed to the proper temperature range in a suitable gaseous environment, the liquid-like material 4 will evaporate, the bond will be consummated, and the structure of FIG. 1 will result.

To coat the metal fibers 3 with the liquid-like material 4, a container is used in which a suitable amount of the fibers, a suitable amount of the liquid-like material, and a suitable amount of the finely-divided bonding material are blended to produce the result illustrated in FIG. 2. The mat of coated fibers is then spread upon a substrate, as illustrated in FIG. 1, and subjected to the environmental conditions which will generate the non-autogenous bond and produce the result illustrated in FIG. 1.

It has been my discovery that to obtain uniformity of dispersion of the finely-divided bonding material over the surface of the metal fibers, it is necessary to first bring the liquid-like material and the granulated bonding material together in a mixture. Once the granulated bonding material is uniformly distributed through the liquid-like material, the mixture can then be applied as a coating on the fibers. Mechanically stirring or mixing the fibers and the liquid-like material together results in a uniform distribution of the finely-divided bonding material over the surfaces of the metal fibers. So distributed, the bonding material enters into forming the bond between the fibers where they touch each other, and the bond between the fibers and the substrate surface where they touch.

The invention was reduced to practice by utilizing a substrate in the form of a sheet of 304 stainless steel 6"×2"×3/16". 5 to 25 grams of 310 stainless steel Ribtec fibers of the specified aspect ratio were blended with 0.5 grams to 6 grams of polybutene 32 and 0.5 grams to 4 grams of Nicrobraz 50, 51, or L.M. in a suitable container. Nicrobraz 50, 51, and L.M. are composed of the following:

| Nicrobraz 50 | |
|---|---|
| Chromium | 14.0% |

| | |
|---|---|
| Phosphorous | 10.0 |
| Carbon | 0.08 Max. |
| Nickel | Balance |
| Nicrobraz 51 | |
| Chromium | 25.0% |
| Phosphorous | 10.0 |
| Nickel | Balance |
| Nicrobraz L.M. | |
| Chromium | 7.0% |
| Boron | 3.1 |
| Silicon | 4.5 |
| Iron | 3.0 |
| Carbon | 0.06 Max. |
| Nickel | Balance |

The resulting mixture was spread in a layer over the surface of the substrate and heated to the range of 1900°–2100° F. in a hydrogen atmosphere for 5 minutes to one hour. This process gave a high quality bond between the metal fibers and the fibers and the substrate, meeting all reasonable tests.

Other Modes For Practicing The Invention

Despite the rather small range of materials and conditions for bonding, the scope of the present invention goes far beyond that utilized in the best mode disclosed above. For example, rather than being limited to 310 stainless steel, the fibers can be any metal whose melting point is above that of the brazing materials employed. For example, they may be selected from the following:
1. Iron and Iron-base alloys
2. Nickel and nickel-base alloys
3. Titanium and titanium-base alloys
4. Molybdenum and molybdenum-base alloys
5. Tungsten and tungsten-base alloys
6. Precious metal and precious metal alloys.

Further, the form of these metal fibers is certainly not limited to the straight rod-like form disclosed above. They may be crimped in any number of shapes which could give interstices in desired patterns.

The requirement for the brazing alloy would be that it demonstrate the ability to bond the metal fibers in question with adequate strength for the application. Further, the temperature required for any of the desired brazing compounds to form a bond is simply that temperature required to adequately form the brazed bond. Although it is perhaps discursive, there may be value in describing a comparative test program employed during the actual reduction to practice of the invention. Three stainless steel substrates of common dimension were selected and on one of them was mounted a structural metallic fiber framework utilizing the process of the invention. Stainless steel fibers were employed and coated with polybutene in which granulated bonding material was uniformly dispersed.

A refractory material was formed from 33G Sauereisen, manufactured by Sauereisen Cements Company. The specified amount of water was added to the Sauereisen to form enough refractory to coat all three substrates. The first substrate was coated with the refractory, using no fibers in any way. Simply, the pure refractory was formed in a layer over the substrate and properly cured. The second substrate was layered with a mixture of the refractory and a generous supply of structural fibers. This fiber-impregnated refractory was cured as recommended. The substrate on which the structural metallic fiber framework was mounted, as formed by the process of the invention, had its interstices penetrated by the refractory and properly cured.

A ¾" wide strip of each of the three substrates was sawed to prepare for a bending test. Both the substrate with the pure refractory, and the substrate with the fiber-impregnated refractory failed to survive the sawing operation. In both cases, the cured refractory parted from the samples sawed from the substrate. Only the substrate on which the fiber framework was bonded by the process of the invention yielded a sample suitable for testing.

The bending test was carried out on the surviving test samply by hydraulically pressing a mandrel on the center of the back of the test sample to distort the sample strip between 20° and 30°. There was no parting of the refractory from the surface of the substrate. As a matter of fact, there was very little distortion of the refractory to be observed. The framework of metal fibers formed by the process of the invention responded in a way to meet every reasonable expectation.

From the foregoing, it will be seen that this invention is one well adapted to attain all of the ends and objects hereinabove set forth, together with other advantages which are obvious and inherent to the method.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawing is to be interpreted in an illustrative and not in a limiting sense.

I claim:

1. A process for bonding randomly arranged structural metal fibers to each other at their points of contact and to the surface of a substrate on which the fibers rest, including,
   dispersing a finely-divided brazing material through a viscous liquid-like material which will evaporate and leave no residue,
   coating the metal fibers with the mixture of brazing material and viscous liquid-like material to spread the brazing material evenly over the fibers,
   forming the coated metal fibers in a layer over the surface of the substrate to which it is to be bonded,
   and placing the coated metal fibers and substrate in an atmosphere having a temperature high enough to evaporate the liquid-like material and braze the metal fibers together and the fibers to the substrate with the brazing material.

2. The process of claim 1, wherein,
   the viscous liquid-like material does not leave a residue upon evaporation which would degrade the quality of the metal bonds.

3. The process of claim 2, wherein,
   the structural metal fibers are composed of stainless steel and have an aspect ratio of at least 50 to 1.

4. The process of claim 3, wherein,
   the bonding material is a finely-divided low-melting metal-phosphorus compound.

5. The process of claim 4, in which,
   the coated fibers and substrate surface are held at a temperature in the order of 1900° to 2100° F. for a range of five minutes to one hour.

6. The process of claim 4, in which,
   the coated fibers and substrate surface are heated in a hydrogen atmosphere.

* * * * *